(12) United States Patent
Flavin

(10) Patent No.: US 7,050,963 B2
(45) Date of Patent: May 23, 2006

(54) METHOD AND APPARATUS FOR FLASH LOAD BALANCING

(75) Inventor: James D. Flavin, Conneautville, PA (US)

(73) Assignee: Progress Software Corporation, Bedford, MA (US)

( * ) Notice: Subject to any disclaimer, the term of this patent is extended or adjusted under 35 U.S.C. 154(b) by 837 days.

(21) Appl. No.: 09/949,657

(22) Filed: Sep. 12, 2001

(65) Prior Publication Data

US 2002/0038331 A1  Mar. 28, 2002

Related U.S. Application Data

(63) Continuation-in-part of application No. 09/870,992, filed on Jun. 1, 2001.

(60) Provisional application No. 60/231,882, filed on Sep. 12, 2000.

(51) Int. Cl.
G06F 9/455 (2006.01)

(52) U.S. Cl. .................. 703/27; 709/227; 709/203; 718/105; 715/744

(58) Field of Classification Search ............... 703/27; 718/105; 709/223; 702/182
See application file for complete search history.

(56) References Cited

U.S. PATENT DOCUMENTS

| 5,613,079 | A | 3/1997 | Debique et al. |
| 5,754,830 | A | 5/1998 | Butts et al. |
| 5,852,812 | A | 12/1998 | Reeder |
| 5,872,972 | A * | 2/1999 | Boland et al. ............... 718/102 |
| 6,104,392 | A | 8/2000 | Shaw et al. |
| 6,216,101 | B1 | 4/2001 | Butts et al. |
| 6,362,836 | B1 | 3/2002 | Shaw et al. |
| 6,397,253 | B1 | 5/2002 | Quinlan et al. |
| 6,449,649 | B1 | 9/2002 | Janay et al. |
| 6,597,891 | B1 | 7/2003 | Tantawy et al. |
| 6,732,145 | B1 | 5/2004 | Aravamudan et al. |
| 6,804,708 | B1 | 10/2004 | Jerding et al. |
| 6,871,210 | B1 * | 3/2005 | Subramanian ............... 709/203 |
| 2002/0091697 | A1 * | 7/2002 | Huang et al. .................. 707/10 |
| 2002/0152311 | A1 | 10/2002 | Veltman et al. |

FOREIGN PATENT DOCUMENTS

EP  0926863 A2  6/1999
WO  WO 99/22332 A1  5/1999

OTHER PUBLICATIONS

Schemers, Roland J., III; "Ibnamed: A Load Balancing Name Server in Pearl", 1995, Ninth System Administration Conference (LISA '95) Monterey, California, Sep. 18-22, 1995□□.*

Minasi, Mark; "Mastering Windows NT Server 4", 1998, Sybex.*

(Continued)

Primary Examiner—Paul L. Rodriguez
Assistant Examiner—Russ Guill
(74) Attorney, Agent, or Firm—Fenwick & West LLP

(57) ABSTRACT

An infrastructure for application service provision compiles a web top for a user to use in launching applications. The links in the web top are calculated to point to servers that have the best performance criteria for each permitted application and server available to the user. The link calculation may be made based on CPU usage, memory usage, the last server that the user was attached to and any other performance criteria.

12 Claims, 17 Drawing Sheets

OTHER PUBLICATIONS

Schemers, Roland J.; "Ibnamed: A Load Balancing Name Server in Pearl", 1995, Conference Proceedings of the Ninth System Administration Conference.*

Minasi, Mark; "Mastering Windows NT Server 4", 1998, Sybex.*

Greer, T., "Understanding Intranets," Microsoft Press, 1998, ISBN 1-571231-702-7, pp. 6-7, 61-65, 77, 105-111, 204, 251.

International Search Report, PCT/US01/17760, Nov. 23, 2001, 3 pages.

Tanenbaum, A., "Computer Networks," Third edition, Prentice-Hall.

Chappell, D., Understanding Windows 2000 Distributed Services, 2000, Microsoft Press, Chapter 3.

* cited by examiner

METHOD AND APPARATUS FOR FLASH LOAD BALANCING

CROSS-REFERENCE TO RELATED APPLICATIONS

This application is a continuation in part of an application entitled "Systems and Methods for Application Service Provision," filed on Jun. 1, 2001 by James Flavin and assigned Ser. No. 09/870,992 and also claims priority to the earlier filed provisional patent application entitled "Method and Apparatus for Flash Load Balancing," filed on Sep. 12, 2000 and assigned Ser. No. 60/231,882.

FIELD OF THE INVENTION

The present invention relates to data processing and, more particularly, relates to systems and methods for providing software applications and data processing to user communities over a network in an efficient, low-overhead manner.

BACKGROUND OF THE INVENTION

In recent years, there have been dramatic improvements in technologies that make bandwidth available for data transmission. These improvements have resulted in ubiquitous networks, such as the Internet, and have brought about rapid change in the operation of numerous industries including the software industry.

Conventionally, the software industry has developed application software for proprietary operating systems. Application software was then conventionally hosted on mainframe computers with output from software applications provided to character based terminals pursuant to proprietary protocols.

With the advent of inexpensive personal computers, this mainframe application software delivery model changed to a client-server model in which application software developers distributed application software programs to end users. In the latter scenario, the end users loaded or downloaded the application software on their computer, a "fat client" machine, and ran the application software directly on a proprietary operating system such as Microsoft Windows or Unix.

Some of the application programs in a client-server model reside on a fat client and require interaction with network resources, such as programs and data resident on servers within the network. In other client—server models, the application programs reside on the server and are provided to the client system with the aid of emulation software on the client system.

With the advent of the Internet and the world-wide web, client systems have been implementing browser programs to present information received from a network to users. The browser programs include an application program interface (API) that programmers may use to create plug-ins that enable browsers to render previously unrecognized information, to recognize new communications protocols and to execute applications. Browser programs, supplemented with plug-ins as necessary, provide the flexibility to interact with software applications that are remotely executed on a network. Moreover, on the server side, an application program that was written for a proprietary operating system or display protocol may be web enabled and provided to browsers on remote client systems over a network. This entails translating the output from the application program into a protocol that is recognized by the browser program or an associated plug in.

The ability to web enable existing applications and remotely host them on a network provides advantages to application software vendors as well as end users of the software. Businesses called application service providers (ASPs) have arisen to facilitate providing application software to end users and their organizations over a network and, in some cases, to facilitate web enabling of software applications. ASP businesses allow users and their organizations the flexibility to rent, as opposed to purchase, software, to avoid time consuming installations of software on client systems and to order and use software on an as needed basis. For organizations, use of an ASP may effectively represent an outsourcing of maintenance operations and information services to the ASP. ASPs also allow software vendors additional software distribution channels from which to derive revenue from end users.

In order for ASP businesses to succeed in delivering software application service to end users, the ASP must be able to deliver reliable, high-performance, secure service that is convenient for organizations and users to configure. If any of these features is lacking, organizations and users may prefer local execution and control of the application software. ASP businesses must also confront problems of scalability, extensibility and integration. With respect to scalability, demand for application service for a particular ASP may exponentially increase several orders of magnitude over a short period of time. Therefore, scalability may be critical.

Accordingly, there is a need for an architecture and methods for providing application service that allow an ASP to commission new servers and equipment for delivering application service rapidly and without interrupting existing service. In addition, there is a need for robust architecture and methods that help prevent service disruption despite server and network link failures. There is a further need for an architecture and methods that make efficient use of server and other resources of the ASP in delivering service. There is still a further need for an architecture and methods that minimize administrative burdens associated with providing application service to organizations including, for example, burdens of providing users and organizations immediate and changeable access to applications and data associated with diverse proprietary operating systems, the ability to bill for service and to perform periodic data backups. There is still a further need for methods that maximize the value of the ASP architecture.

There is still a further need for an infrastructure that permits a user of application provision services to have organized access to the user's permitted applications and to be able to have one touch access to the best performing application server when launching a particular application available to the user.

SUMMARY OF THE INVENTION

According to the present invention, an architecture for providing software application service includes an intranet comprising redundant links to a network and redundant switches for reliable provision of application services to client systems over the network. The intranet provides a common interface for managing organizations and their users, granting access to application software, including only certain versions thereof, and data sets, tracking usage of services and performing periodic backing up of data. The architecture of the intranet is scalable so that application, administrative and brokering servers may be quickly added to keep up with exponential increases in demand.

According to one embodiment of the invention, a method of efficiently provisioning application services for a plurality of diverse applications includes creating an organization entity within a data center, creating an organization unit for the organization entity and associating a group identification number with the organization entity. The method further includes propagating the organization unit and the group identification number for the organization entity to at least one application server within the data center. The method may further include collecting information about the organization entity and storing the collected information in an administrative database. The method may further include associating a suffix with the organization entity, verifying the uniqueness of the suffix within the data center and storing the suffix, the organization unit and the group identification number in an administrative database. Permission information for application services and data sets may also be stored in association with the organization entity in the administrative database.

The applications which form the basis of the application services may be published applications or custom applications. The applications may also be, for example, Windows based applications, Unix based applications, Linux based applications or other diverse applications. The organization information may be propagated to application servers within the data center based on an active directory or multi-master architecture.

The method may further include a facility for adding a user to the organization entity, associating a user identification with the user and propagating the user identification in association with at least one of the organization units and the group identification numbers to at least one application server within the data center. The user identification and associated permission information may be stored in the administrative database.

According to another embodiment of the present invention a server automatically configures a client systems for accessing the application services provided at a data center (or coordinated through a data center when servers at multiple locations are involved). According to a method, a server receives receiving a request for configuration from a user and authenticates the user based on a userid and password. The method further include determining configuration information based on the userid of the user and remotely configuring the user's browser based on the configuration information. The configuration information may include a list of one or more applications and one or more servers that the user is entitled to use.

According to another embodiment of the present invention, an infrastructure for application service provision compiles a web top for a user to use in launching applications. The links in the web top are calculated to point to servers that have the best performance criteria for each permitted application and server available to the user. The link calculation may be made based on CPU usage, memory usage, the last server that the user was attached to and any other performance criteria.

A method of load balancing authorized applications for a user according to an embodiment of the invention includes monitoring at least one performance characteristic of at least one application server, storing performance information for the monitored servers in a flash database and storing user access information in an access database. The method further includes calculating, based on the flash database and the access database, an address of the best performing server for each permitted application for the user and assembling a web page having at least one link, each link corresponding to an address of the best performing server for a permitted application for the user. The method may further include monitoring a user logout and storing in the flash database the identity of the last server that the user was connected to. Also, the performance calculation may be based in whole or in part on the identity of the last server that the user was connected to.

BRIEF DESCRIPTION OF THE FIGURES

The above described features and advantages of the present invention will be more fully appreciated with reference to the detailed description and appended figures in which.

DETAILED DESCRIPTION

According to the present invention, an architecture for providing software application service includes an intranet comprising redundant links to a network and redundant switches for reliable provision of application services to client systems over the network. The intranet provides a common interface for managing organizations and their users, granting access to application software, including only certain versions thereof, and data sets, tracking usage of services and performing periodic backing up of data. The architecture of the intranet is scalable so that application, administrative and brokering servers may be quickly added to keep up with exponential increases in demand.

Figure 1:
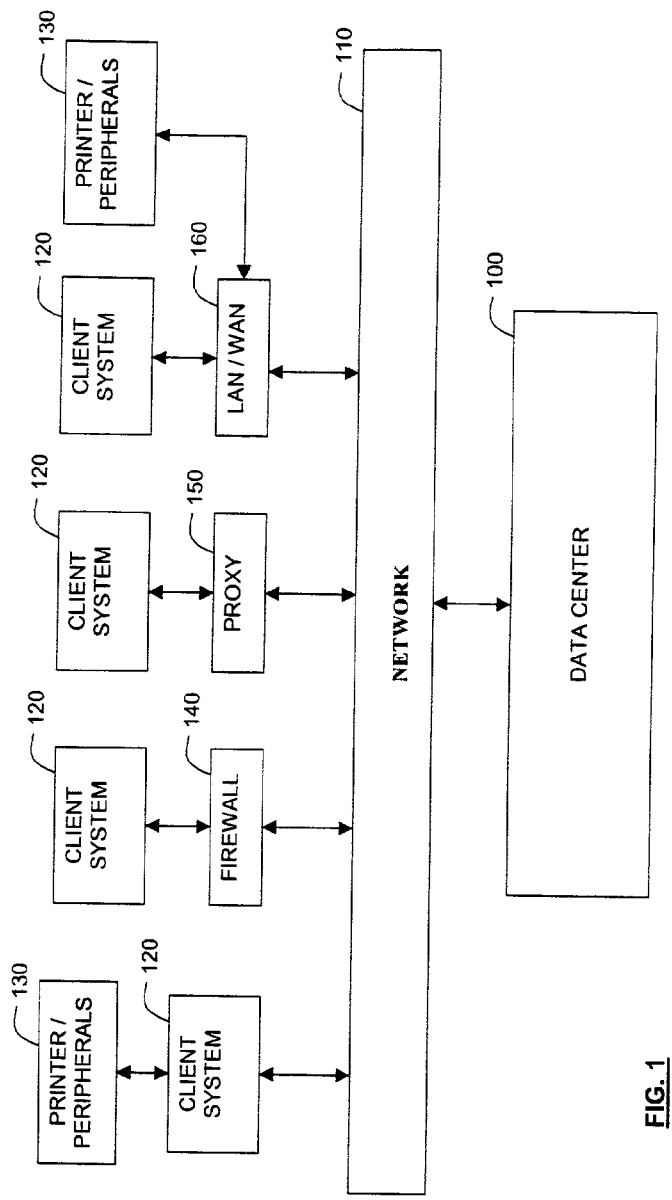
FIG. 1 depicts various client configurations for connecting to a data center from which application service provision services are provided according to embodiments of the present invention.

FIG. 1 depicts various client configurations for connecting to a data center from which application service provision services are provided according to embodiments of the present invention. Referring to FIG. 1, a data center 100 is coupled to the client systems 120 via a network 110.

The network 110 may be a local area network, a wide area network, the public switched telephone network, the interconnected backbones, routers, bridges, switches and servers known as the Internet, other communications links and combinations thereof. The network may include direct electrical connections, wireless, optical or any other communications links, including analog, digital, circuit switched and packet switched, for transmitting information.

The client systems 120 may be general purpose computer systems which each incorporate modems or other communications technologies for exchanging information with the network 110. The client systems 120 may be coupled directly to the network 110 or may illustratively be coupled by way of a firewall 140, a proxy 150 or a LAN/WAN 160. Each client system may also be coupled to a printer or other peripherals 130. A printer or other peripheral 130 may also be coupled to the network 110 via a LAN/WAN 160 as shown.

Figure 2:
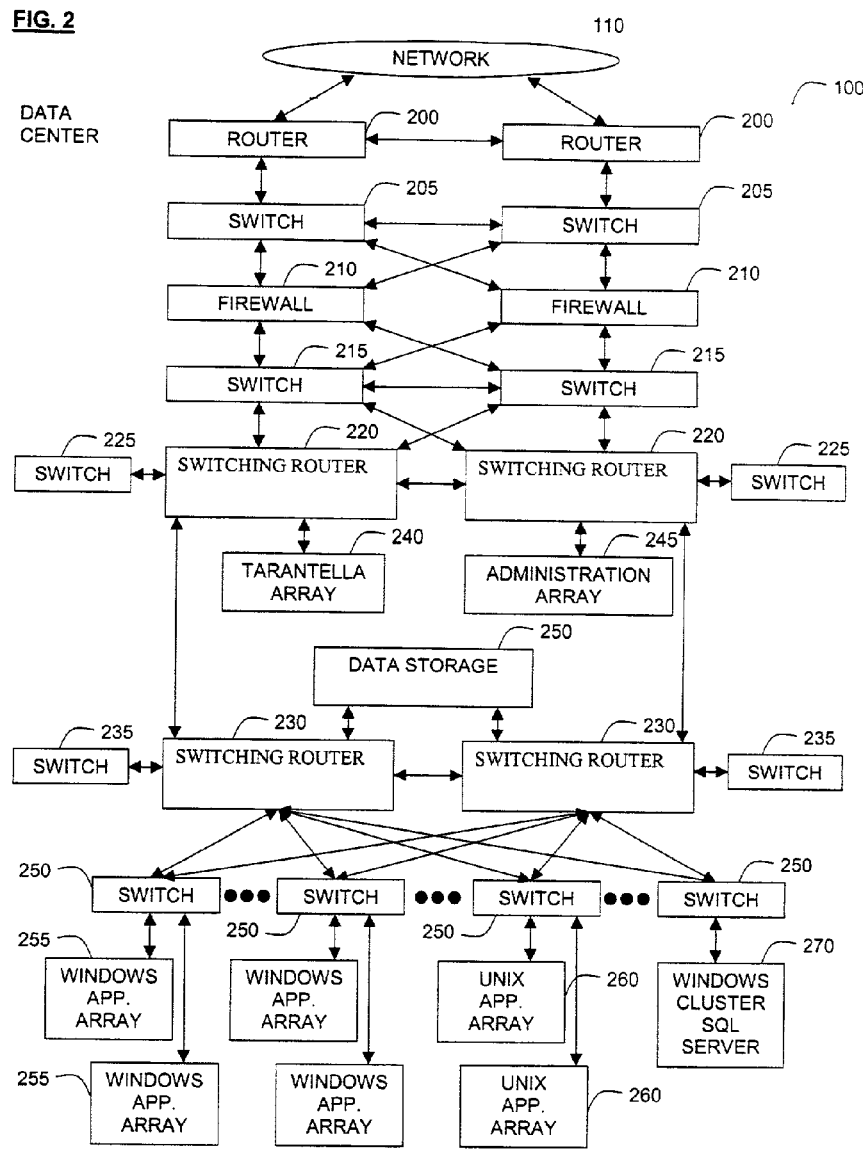
FIG. 2 depicts an embodiment of the architecture of a data center from which application service provision services are provided according to embodiments of the present invention.

FIG. 2 depicts an illustrative implementation of a data center for providing application services according to an embodiment of the present invention. Fundamentally, the architecture shown is flexible, robust and redundant. Referring to FIG. 2, the network 100 includes routers 200 coupled in parallel to the network 110. One of the routers 200 is within a left leg and the other is in a right leg of the network. The parallel connection is redundant to help prevent data center down time.

The routers 200 exchange packet data between the network 110 and the rest of the data center 200. The routers 200 receive and forward packets to appropriate elements within the data center 100 based on headers in the packets. The parallel switches 205 switch packets in the data center to steer packets in the appropriate direction. The switches 205 are interconnected as well such that if a path in the direction of the left leg is broken, packets may be switched to the right leg.

The switches 205 are coupled to firewalls 210 in a criss-cross arrangement. Switches 215 are also coupled to the firewalls 210 in a criss-cross arrangement as shown. This arrangement permits packet traffic to by-pass one firewall 210 and travel through the other in the event of failure of one. In essence, the firewalls 210 look at each packet entering or leaving the network and accepts or rejects it based on user-defined rules. The firewall may apply application gateway techniques, circuit-level gateway techniques which apply certain tests prior to establishing a connection and/or proxy server techniques. Proxy server techniques effectively hide the true, internal data center network addresses from the network 110.

The switching routers 220 and 230 are coupled each coupled to the left and the right legs of the network and to each other. The switching routers 220 and 230 route data between and among a tarantella array 240, an administration array 245, a data storage unit 250 and a plurality of switches 225, 235 and 250. The switches 225 filter and forward packets between segments of the data center network. According to one embodiment of the invention, the data center network depicted is an ethernet network or a giga-bit ethernet network. The switches 225, 235 and 250 in this implementation may be used to implement a switched ethernet or giga-bit ethernet network.

The data storage unit 250 stores user application data for users of the ASP services. The data storage unit 250 serves files to the other functional units within the data center and to users at client systems 120 accessing the network.

Figure 8:
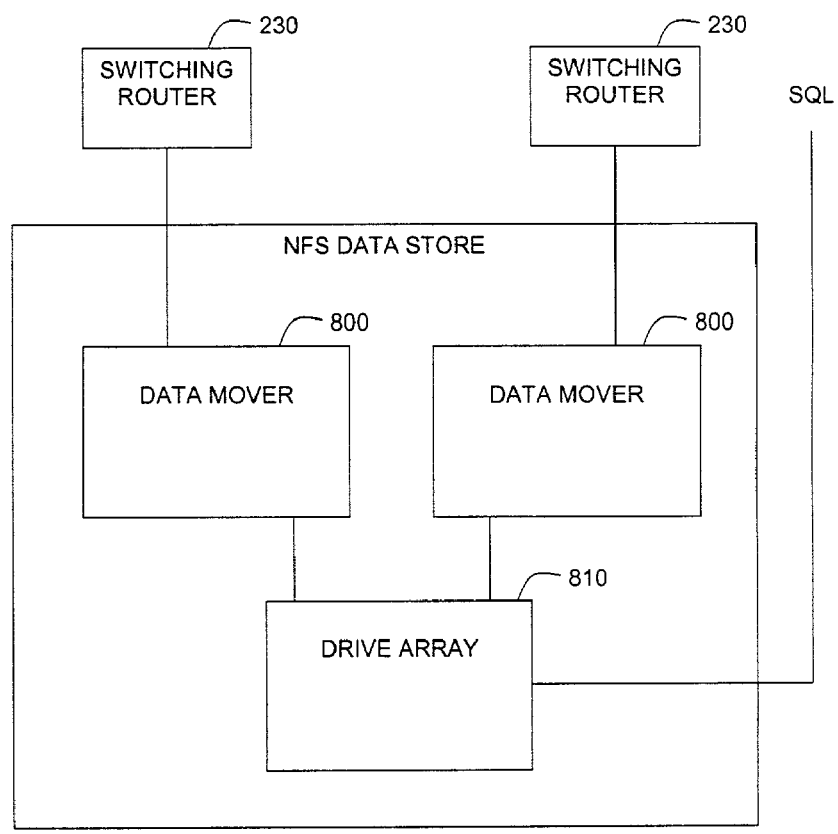
FIG. 8 depicts a data storage unit within an application service provider architecture according to an embodiment of the present invention.

FIG. 8 depicts an internal view of an embodiment of the data store. Referring to FIG. 8, the data storage unit includes two data movers 800 which provide access to a drive array. The drive array may comprise a redundant array of inexpensive drives (RAID) type storage device or other storage device. The data movers 800 offer redundant access to the drive array 810 such that if one data mover 800 fails the other data mover 800 takes over. The data movers and array may be configured to provide storage in a network file system to allow users access to shared to files stored in the array. There may be a separate system query language (SQL) path into the drive array 810 to facilitate database operations.

Figure 3:
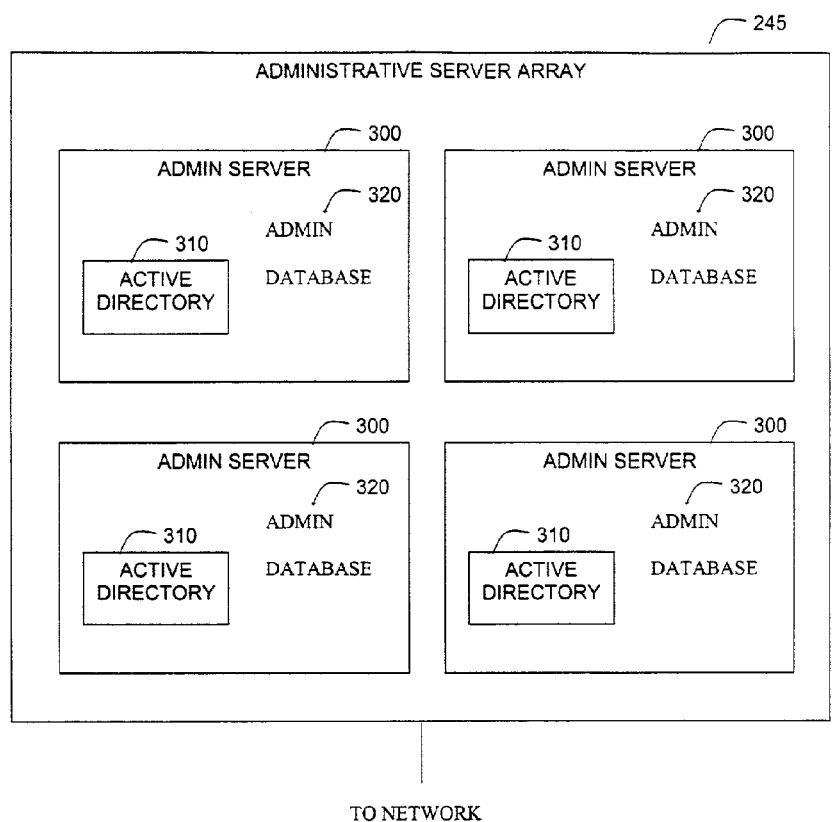
FIG. 3 depicts an administrative server array according to an embodiment of the present invention.

FIG. 3 depicts an administrative server array 245. The administrative server array 245 maintains data which identifies information for organizations and users of the data center and other details that are described below and propagates the data to the other functional components of the data center 100. The administrative server array 245 includes administrative servers 300 as shown. The administrative servers may each include an active directory 310 and an administrative database 320. The active directory 310 stores and automatically propagates administrative data to windows servers and other compatible servers. The administrative database 320 is used to store and propagate administrative data to UNIX based and compatible servers. The administrative server array and the servers themselves may be coupled to one of the switching routers 220 directly, however other convenient arrangements are possible. The population of the administrative database and the active directory to manage access control to the data center and other functions is described in more detail with reference to the method flow diagrams of FIGS. 9–11.

Figure 4:
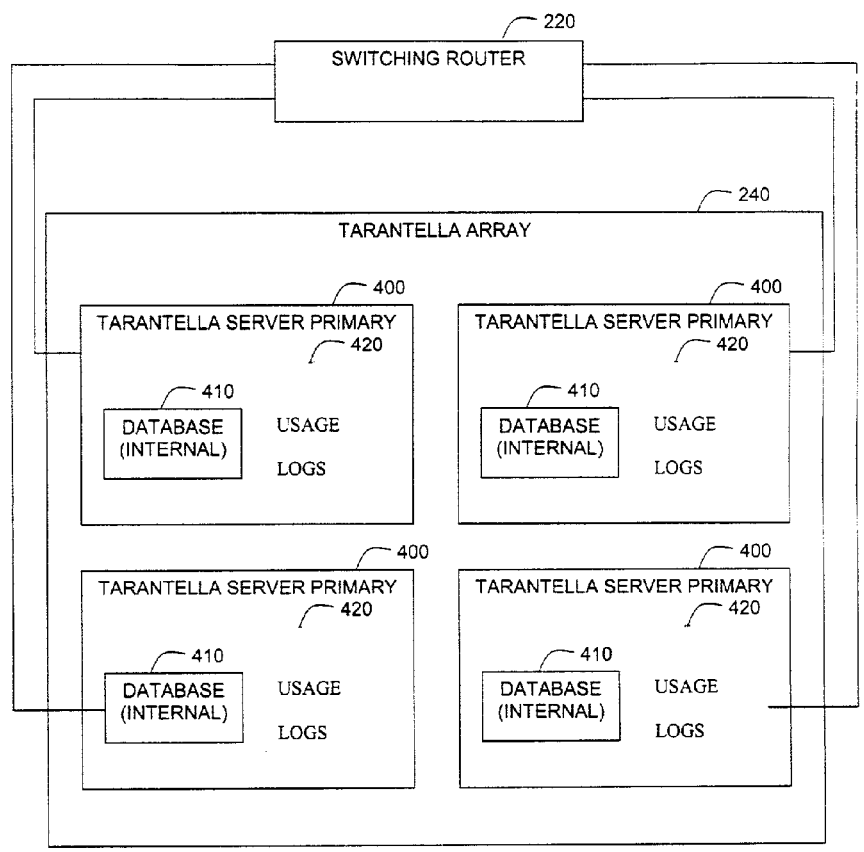
FIG. 4 depicts a tarantella server array within an application service provider architecture according to an embodiment of the present invention.

FIG. 4 depicts an array of tarantella servers 400, which may be connected to the data center 100 network via the switching router 220. The tarantella array and servers within the array may be used as an intermediary between UNIX application servers within the data center and client systems coupled to the data center 100 via the network 110. Pursuant to this intermediary function, a client system which seeks to access a UNIX server does so via a tarantella server. The tarantella server communicates with the client system according to a protocol called AIP and with the UNIX or other application according to a different protocol such as RDP. The client system includes corresponding capability to interface with the tarantella server pursuant to AIP and similarly the UNIX server communicates with the appropriate Tarentalla server according to the RDP or other compatible protocol. Tarantella servers and their functionality in brokering applications is set forth in U.S. Pat. No. 6,104,392

Figure 5:
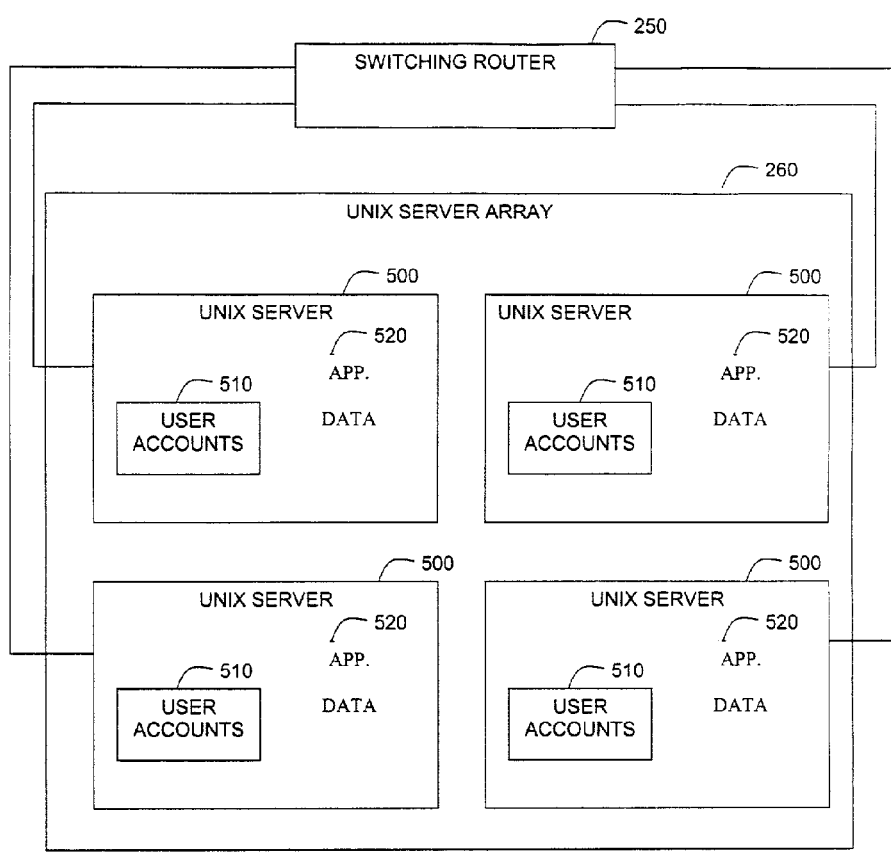
FIG. 5 depicts Unix application server array within an application service provider architecture according to an embodiment of the present invention.

FIG. 5 depicts a UNIX server array 260 which is coupled to the data center 100 network via a switching router 250. The UNIX server array includes a user accounts database 510 and an application data 520 portion. The application data portion stores data for users of the servers. The application data may be physically resident in the data storage unit 250 or on the UNIX server itself. The UNIX servers store and execute application programs in response to authorized user requests to execute the applications. Access to the applications and application data is controlled by the user accounts.

During operation of the data center, a user may interact with browser software on the client system to access the data center. According to one embodiment of the invention, the user be routed through the data center network to a tarantella server. The tarantella server may transmit an interactive web page back to the user which permits the user to launch applications, such as UNIX applications. When UNIX applications are launched in this manner, the user interacts with the Tarantella server via, for example, the AIP protocol. The AIP protocol delivers to the client system display data and the application interface from the chosen UNIX application.

Figure 6:
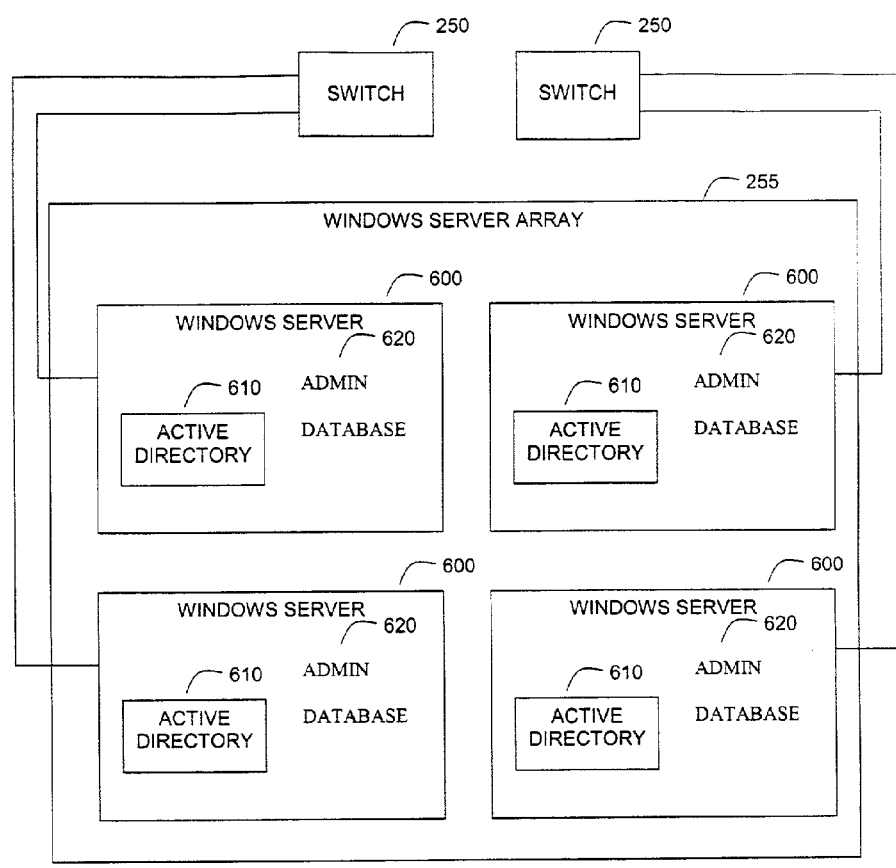
FIG. 6 depicts a windows application server array within an application service provider architecture according to an embodiment of the present invention.

FIG. 6 depicts a windows server array which is analogous to the UNIX server array. However, the windows server array runs the Microsoft Windows™ operating system. The windows server array may be coupled to the data center 100 network via the switches 250. The windows server array includes an active directory 610 and an administrative database 620 for storing administrative information that may be used for application and file access control and other purposes. The windows server array also has application programs mounted on it with which users at client systems may interact via Tarantella as described above or via other protocols.

Figure 7:
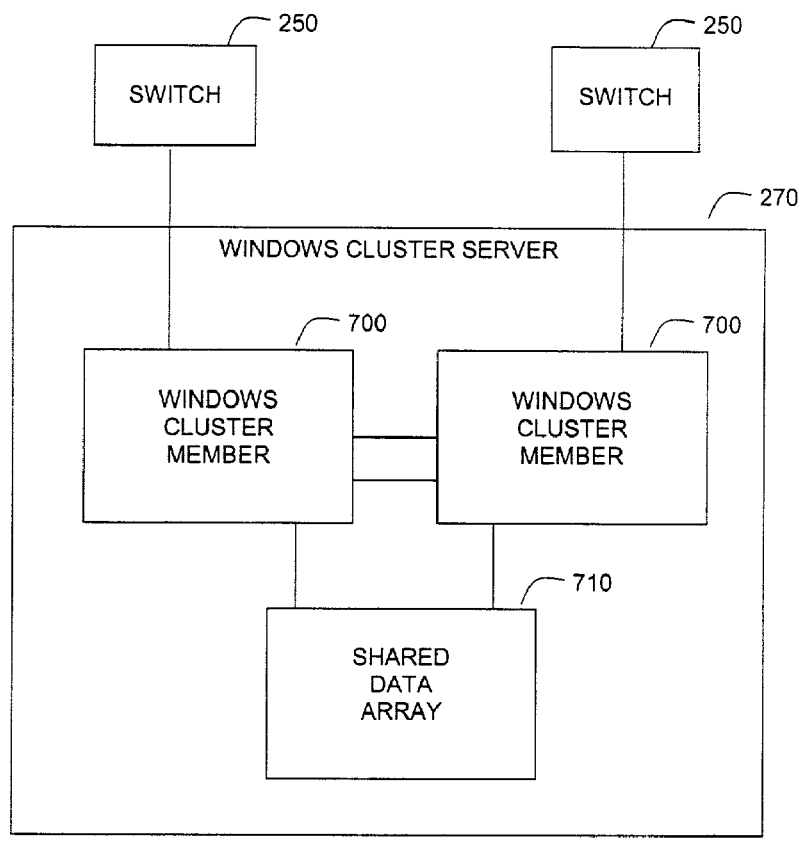
FIG. 7 depicts a windows cluster server within an application service provider architecture according to an embodiment of the present invention.

FIG. 7 depicts a Windows cluster server 270. The Windows cluster server 270 which may include cluster members 700. The cluster members 700 may be coupled together and to a shared data array 710. This arrangement provides another method for accessing the data storage via SQL.

Figure 9:
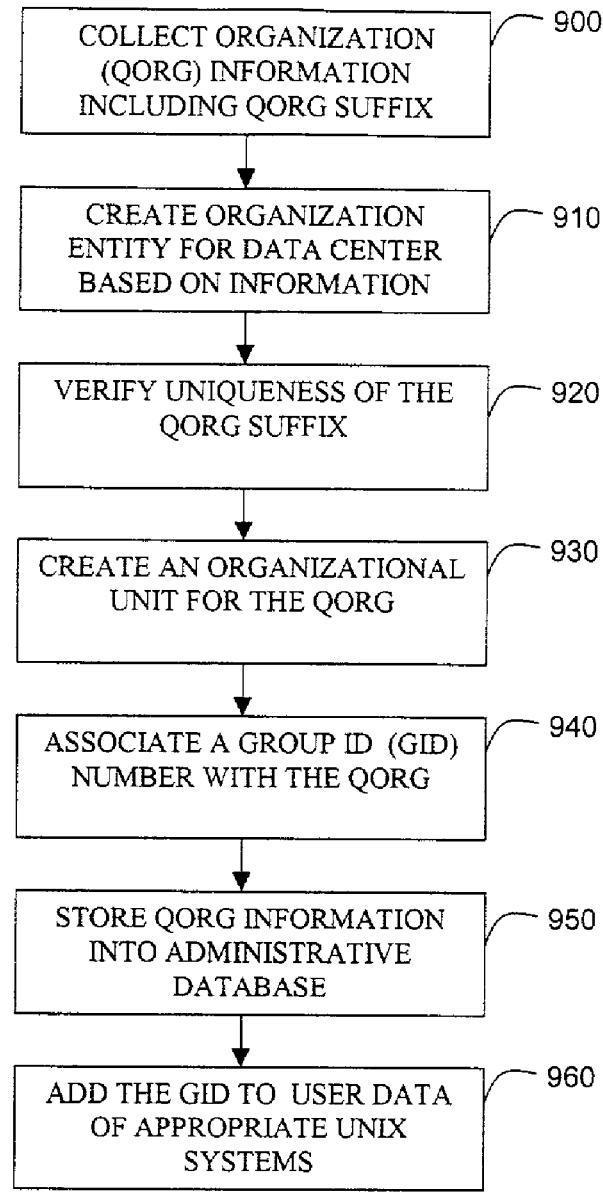
FIG. 9 depicts a method of defining organizations within a data center according to an embodiment of the present invention.

FIG. 9 depicts a method of defining organizations within a data center according to an embodiment of the present invention. The method may be implemented by an administrative tool which amounts to a software program resident on the administrative server or another server for obtaining administrative information.

Referring to FIG. 9, in step 900 organization information is collected to define an organization to the data center 100. This information may include the name of the company, billing information, the name of a designated administrative contact and other information. According to one embodiment, this information includes a QORG suffix. The QORG (or QORG suffix) is a short name used to identify the organization and maintain user name uniqueness in the Data Center. (i.e. a1x, m2m). The organization may be an individual or a corporation but in general is an organization or entity that is to be billed as a single unit. The organization may have associated with it a plurality of users that are entitled to ASP privileges with respect to particular applications. These users may be divided into various groups with various access privileges.

In step 910, an organization entity is created based on the information collected in step 900. In step 920, the uniqueness of the QORG suffix is checked by querying the administrative database to determine whether or not the QORG suffix is taken. If not, then another QORG must be chosen.

Step 930 may begin after QORG uniqueness is established. In step 930, a Windows organizational unit for the QORG is established. Then in step 940, a group identification (GID) number is associated with the QORG. In step 950, the information for the organization is stored into the administrative database. The information is also stored into the active directory.

In step 960, the GID is added to user data of the appropriate UNIX system and to the active directory of appropriate Windows systems. Organizations, for example, may be serviced by one or a subset of UNIX and Windows servers.

Figure 10:
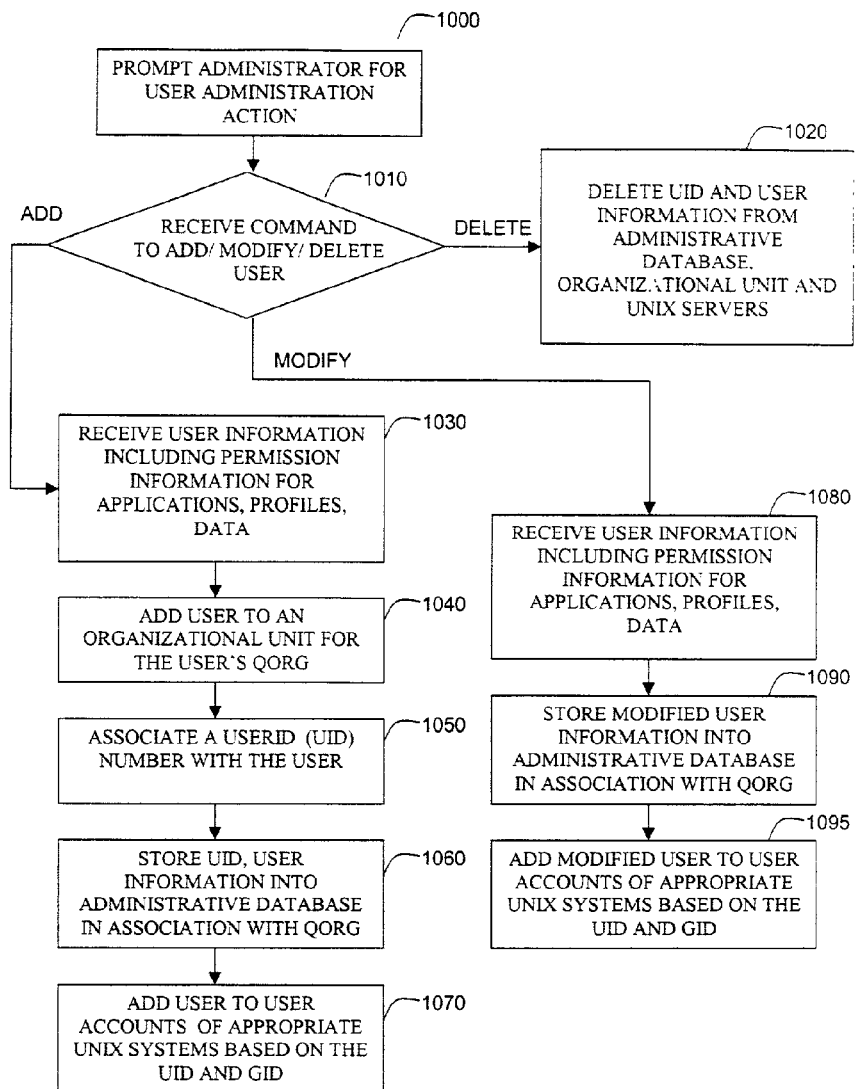
FIG. 10 depicts a method of adding users within a data center according to an embodiment of the present invention.

FIG. 10 depicts a method of adding users within a data center according to an embodiment of the present invention. The method of FIG. 10 is also be implemented by an administrative software tool. The administrative software tool may be run by on an administrative server and in general is also run pursuant to the ASP mode. Accordingly, designated administrators may interact directly with the administrative tool to define user access privileges and other privileges and features described below. This is powerful and allows a data center to roll out service to a large number of users with very little human capital required for administration because the organizations themselves perform, to a large extent, their own administration.

Referring to FIG. 10, in step 1000 a user (a designated administrator at a client system) is prompted by the administrative tool to take an action with respect to user administration. In step 1010 the tool determines whether the command is to add, modify or delete user data. IF the command is to ADD user data, then in step 1030, the tool receives user information including permission information for applications, profiles, files and data. In step 1040, the user is added to an organizational unit within the user's QORG. In step 1050, a user identification (UID) number is associated with the user. Then in step 1060, the UID and user information is stored into the administrative database in association with the QORG. The information is also stored into the active directory. In step 1070, the user is added to the user accounts of appropriate UNIX systems to permit access to those systems. The systems are chosen based on the UID and GID of the user's organization. In this manner new users are identified to the data center and permitted to access ASP services and generate revenue for the data center. This may occur without any involvement by administrative personnel of the data center 100.

If in step 1010 the command is to modify a user, then step 1080 begins. In step 1080 user information may be received including permission information for applications, files profiles, and other information generally such as the user's name, address, phone number, email address, etc. In step 1090, the modified user information is stored into the administrative database in association with the QORG of the user. The modified user information is also stored into the active directory of Windows servers. In step 1095, the modified user id may be added to the user accounts of appropriate UNIX and Windows systems.

If in step 1010 the command is to delete a user then step 1020 begins. In step 1020, the UID and user information is deleted from the administrative database and active directories however a tombstone is saved.

Figure 11:
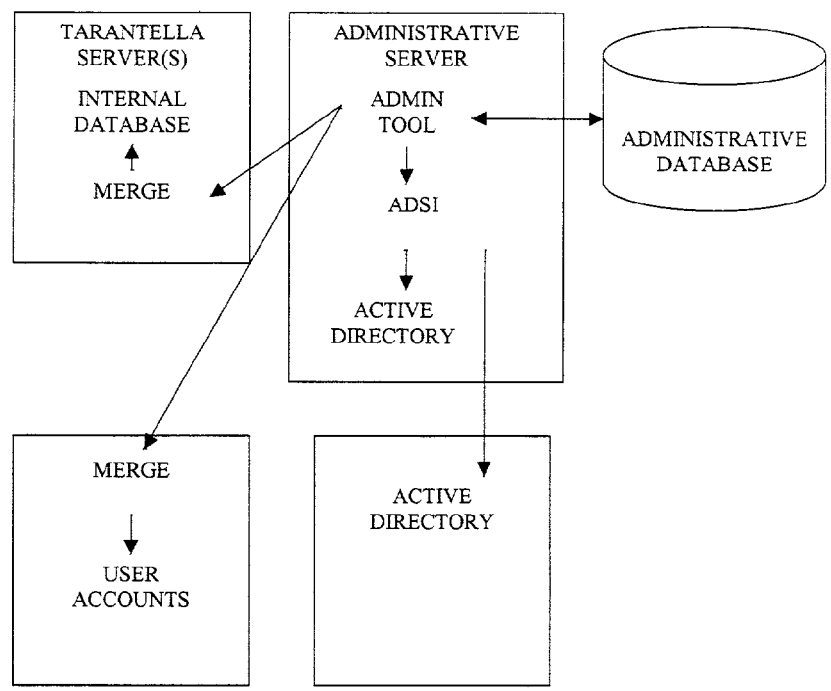
FIG. 11 depicts a functional view of a method of propagating organization and user data to a plurality of servers within a data center according to an embodiment of the present invention.

FIG. 11 depicts a graphical illustration of the manner in which the administrative tool interacts with the administrative database, the active directory, the internal database of Tarantella servers and the user accounts of UNIX servers. When there is a change in organization or user information or administrative information generally, this information is propagated as illustrated. The administrative tool updates the administrative database based on interaction with the user. The added, modified or deleted information is then propagated to the active directories via the ADSI block. The ASDI block is an Active Directory Service Interface and governs mapping administrative information into a format recognized by the active directory. The added, modified or deleted information is then propagated to the user accounts and to the internal database of the Tarantella servers via a database merge program.

Figure 12:
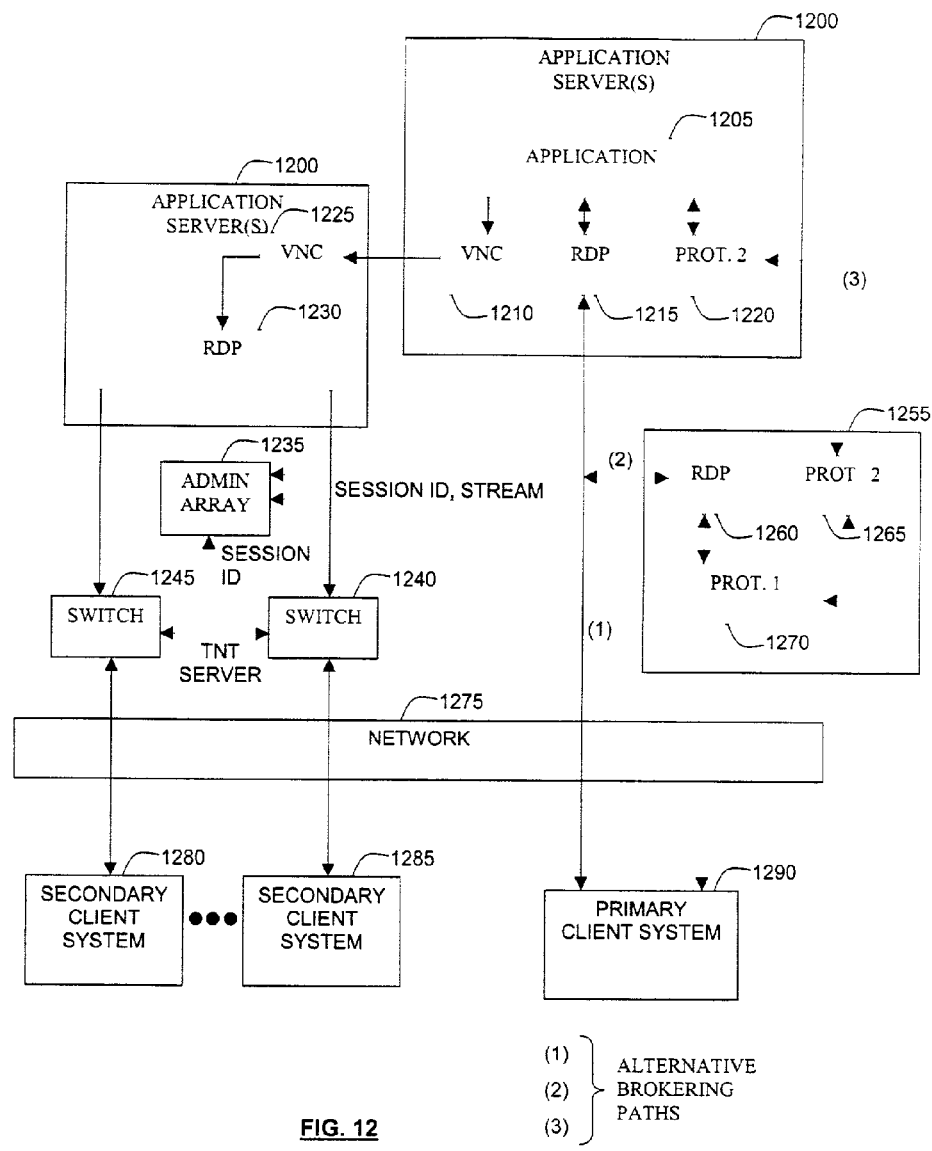
FIG. 12 depicts an embodiment of an architecture for providing the output from a primary application hosted in an application server environment to a plurality of users over a network.

FIG. 12 depicts an illustrative embodiment of an architecture for providing the output from a primary application hosted in an application server environment to a plurality of users over a network. This embodiment may be very useful for conveying presentations to a plurality of users simultaneously via a network.

Referring to FIG. 12, application servers 1200 within a data center 100 are configured to provide applications to client systems 1280–1290 over the network 1275. The client system 1290 is configured to be a primary client system which is used by a primary user to interact with an application of interest to a broad audience. For example, the primary user may desire to give a presentation to a broad audience by interacting with the MICROSOFT POWER POINT application in order to view and page through a particular MICROSOFT POWER POINT presentation file that is of interest to a broad array of users. The primary user may, accordingly inform a plurality of users or the public at large that the presentation will occur at a particular time and date and provide information necessary to access the presentation.

At the appointed time and date, the primary user at the primary client system 1290 may connect to the application server 1200 for providing application hosting of the desired application to the primary user according to the principles of application access and delivery discussed herein. Accordingly, the primary client system 1290 may be coupled pursuant to a desired protocol to an application server 1200 that is available to the primary user.

The primary user may be connected to the application server 1200 in several different ways depending on the protocols involved. For example, the primary client system 1290 may be coupled to the application server to interact with the desired application via the RDP protocol 1215 as shown in path (1). Alternatively, the primary client system may communicate with the application server 1200 directly through a different protocol through several protocols with one or more translation steps. For example, the primary client system 1290 is shown as having alternative brokering paths (2) and (3) that make use of an intermediate server 1255 that includes a RDP block 1260, a protocol 1 block 1270 and a protocol 2 block 1265. The primary client system 1290 may interact with the protocol 1 block 1270 pursuant to protocol 1. The protocol 1 block 1270 may then translate the output into RDP for interaction with the RDP unit 1260 and ultimately with the application server 1200 via the RDP protocol through path (2). The protocol 1 block 1270 may alternatively translate protocol 1 into protocol 2 for interacting with the protocol 2 block 1255 and application server 1200 according to protocol 2 via path (3). In general, however, any protocol path with one or more intermediate translations may occur. Moreover, any translations may occur on the primary application server 1200 or on one or more intermediate servers 1255 as shown.

Once the primary client system 1290 establishes its connection with the primary application server 1200, the primary user may interact with the primary application. In addition, the user may interact with an administrative server 1235 to establish that the user's session should be treated as a broadcast session. In addition, the user interacts with the administrative server 1235 to provide access data that users of secondary client systems must have in order to access the broadcast session.

When the primary client system indicates to the administrative server 1235 and/or to the application server 1200 that the user's session is a broadcast session, then user is prompted to specify a session number and an optional password for the session. The session number is used to identify the broadcast session to the data center 100 and to give secondary users 180 and 1285 information necessary to access the broadcast session. The optional password may be used to provide additional security to prevent unauthorized access to particular sessions.

The session number and password may be generated by the administrative server prior to the broadcast session and provided to the primary user. The primary user may then distribute the assigned session number and password to desired participants for them to subsequently use to access the broadcast session at the appointed time.

When the primary client system completes the login process for a particular broadcast session, then the application 1205 with which the user is interacting outputs data pursuant to a broadcast protocol. The VNC protocol 1210 is pictured as the illustrative broadcast protocol output by the application 1205. However, any other broadcast protocol may be used. The application data output pursuant to the VNC may be input to another application server 1202 for further translation from the VNC protocol 1225 to the RDP protocol 1230, for example. Accordingly, once the primary user specifies that a particular session with an application 1205 is to be a broadcast session, the output of the session is simultaneously provided to the primary user according to an ordinary protocol and is translated into a broadcast protocol in anticipation of transmission to one or more secondary client systems according to one or more protocols for the secondary client systems 1280.

The users of the secondary client systems 1280–1285 may be unknown to the data center. However, prior to or at any time during the primary user's broadcast session the primary user or other party may make available to users of the secondary client systems the session ID and password for a particular session and the address of the server where the session is being hosted. The address is generally an internet protocol (IP) address or a URL.

The users of the secondary client systems 1280 and 1285 may then direct browser software resident at the systems to connect to content at the address provided for the session. The browsers may then couple the client systems 1280–1285 over the network 1275 to the appropriate administrative server 1235 via, for example one or more switches 1240 within the data center 100. The address provided to the secondary users may be the address of a page of content which causes the browser of each secondary client system to prompt the user for a session ID and/or a password. When the user provides a valid session number and/or password to the administrative database, the administrative server 1235 redirects the users browser to start receiving content from the application that was first output pursuant to the broadcast protocol and that corresponds to the user's session ID. The depending on the configuration of the user's browser and the data center 100, the user may receive content from a separate application server 1202 and pursuant to a translation of the broadcast protocol, such as the RDP translation of the VNC protocol. Alternatively, the broadcast protocol may be the protocol ultimately used for transmission to the end user. In still other embodiments, the output from the primary application for the session may be output directly from the application server 1200 either in the broadcast protocol or pursuant to one or more intermediate protocol translations.

As additional secondary users are connected through the network 1275 to the data center at the address of the broadcast session, the switches 1240 and 1245 may be used to couple output to each new user. The switches may also couple users to one or more application servers to perform protocol translation or parallel output depending on the number of simultaneous users and the capacity of each switch and application server in the path of the broadcast session. In this manner, a primary user may interact with an application and cause the output to be simultaneously transmitted to an arbitrarily large target audience.

Figure 13:
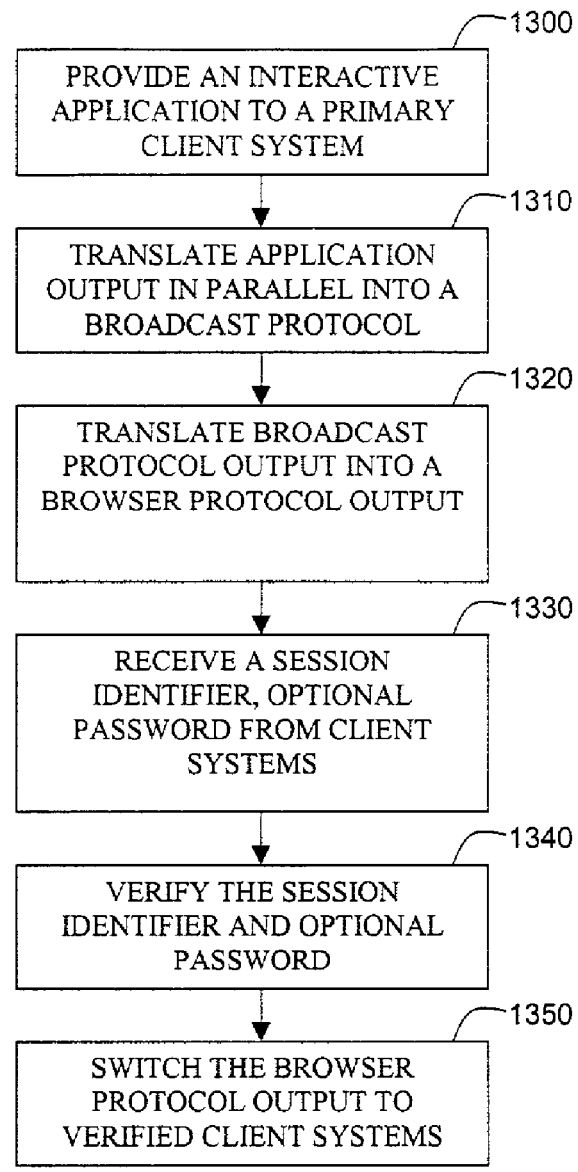
FIG. 13 depicts a method of providing the output from a primary application hosted in an application server environment to a plurality of users over a network.

FIG. 13 depicts an illustrative method of providing the output from a primary application hosted in an application server environment to a plurality of users over a network. Referring to FIG. 13, in step 1300, a data center provides an interactive application to a primary client system. Then in step 1310, a server translates the application output into a broadcast protocol. In step 1320, the broadcast protocol output is translated into a browser protocol output. In step 1330, a server receives a session identifier and an optional password from secondary client systems. Users of the secondary client systems provide the session identifier and optional password in order to access the broadcast session by pointing their browser to a predetermined URL address. In step 1340, the server verifies the session identifier and optional password. When the secondary user is authenticated pursuant to step 1340 then in step 1350 the output of the application is provided to the secondary client browser pursuant to a browser protocol which may be the same as or different from the broadcast protocol.

Figure 14:
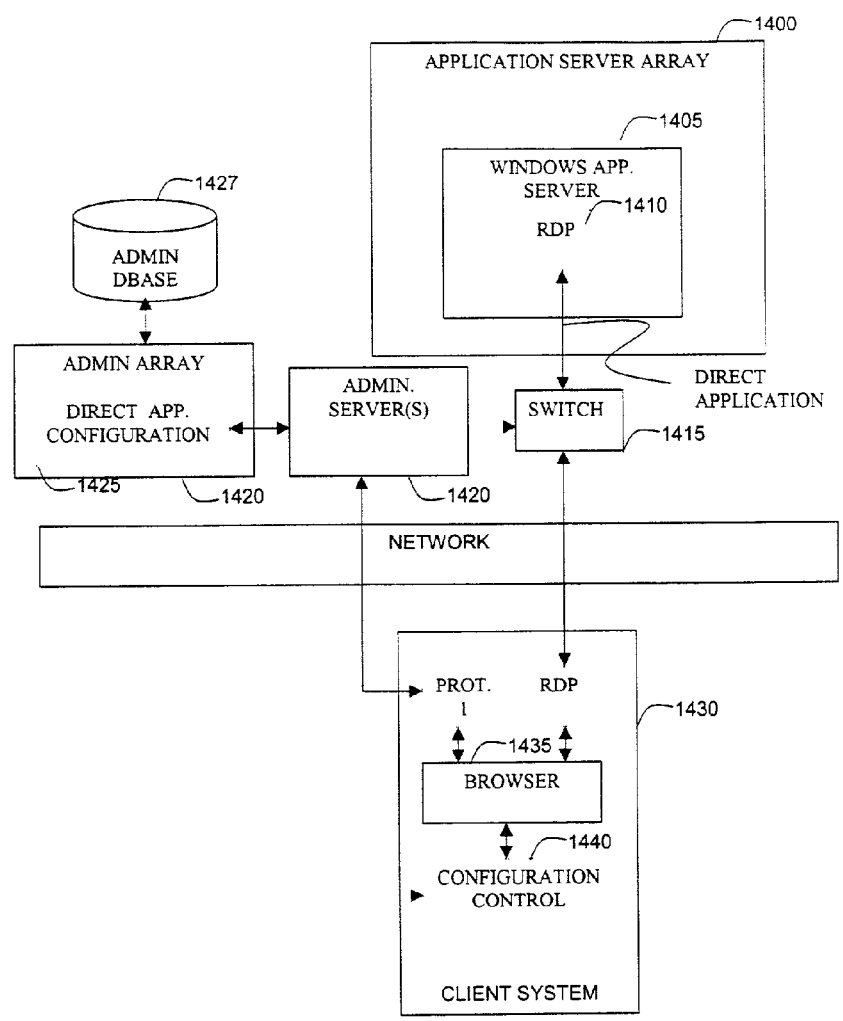
FIG. 14 depicts a server side architecture for configuring client systems automatically for access to a data center.

FIG. 14 depicts a server side architecture for configuring client systems automatically for access to a data center. Referring to FIG. 14, a client system 1430 includes one or more protocols for connecting between a resident browser 1435 and a data center 100 via a network. The client system initially is configured with an address, such as a URL, of an administrative server 1420 within a data center. The user's browser fetches a web page from the specified address and displays it to the user. The web page prompts the user to log in.

Upon log in, the administrative server queries an administrative database 1427 to determine configuration information for the user. The configuration information (described below) is returned to a direct application configuration program 1425 running on an to administration server, which may or may not be the same as the administrative server 1420 that served the web page. The configuration information may be served to the client system pursuant to any arbitrary protocol including RDP or what in FIG. 14 is depicted as protocol 1, which may be any convenient protocol. The configuration information may be further formatted and embedded into any language including html, xml, a java script, an active x control script or any other convenient format that may automatically configure a browser on the client system. The information alternatively may be formatted into an executable file that the user can execute to configure the user's system.

The information may be returned to an optional configuration control unit 1440. The configuration control unit 1440 may be used to configure the browser 1435 based on the configuration information. Alternatively, the configuration information may be sent directly to the browser for causing the browser, or a plug-in thereto, to access the user's applications in an appropriate way. After the configuration is accomplished at the client system according to the method of FIG. 15, the client system 1430 and the client's browser may be coupled, for example, to an administrative server where the user's personalized list of applications resides and from which the user may launch those applications. Alternatively, the client's browser may be coupled directly to an application server 1405 pursuant to, for example, the RDP protocol for the client to directly access a permitted application.

Figure 15:
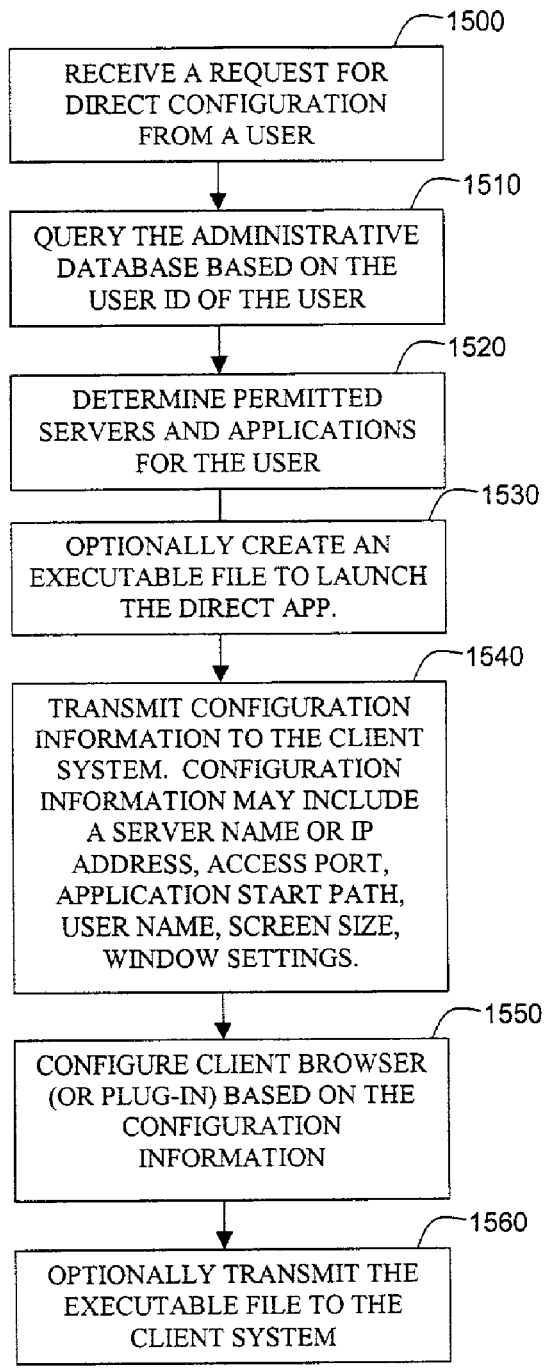
FIG. 15 depicts a server side method of configuring a client system for automatic connection to a predetermined list of applications for application service provision for a user (the user's webtop).

FIG. 15 depicts a server side method of configuring a client system for automatic connection to a predetermined list of applications for application service provision for a user (the user's webtop) or for configuring the client to connect directly to an application hosted in an application service environment. Referring to FIG. 15, in step 1500 an administrative server receives a request for configuration from a user. According to this step, the user first configures his browser to point to a predetermined address such as a URL. The user's browser then fetches a web page from that URL. The web page, which includes prompts for the user to provide a userid and password, is served by an administrative server 1420. If the user is a first time user, the user may be provided with userid and password information by email, telephone, by his or her employer or organization or by any other convenient mechanism. The direct application configuration program 1425 verifies the userid and password.

In step 1510, the direct application configuration program 1425 causes the administrative server 1420 to query an administrative database 1427 based on the userid and password information provided by the user. The administrative database determines, based on the userid, which servers and applications the user is permitted to use. In step 1530, the direct application configuration program optionally creates an executable file including configuration information (described below) based on the information returned from the database. An executable file will be returned if the user selects an option to have an executable file created for the user to download and execute in order to configure, for example, a terminal emulation program.

In step 1540, the direct application configuration program causes the administrative server to serve to the browser 1435 of the client system configuration information that may be used by the client's browser directly, or indirectly by a plug-in such as a java or active-x plug-in. The configuration information may include a server name or IP address to which the client should connect to access one or more applications that the client is entitled to access. The address may be, for example, the address of an administrative server that has stored thereon the client's web top. Alternatively, the address may be, for example, the address of an application server that hosts an application that the client is permitted to access and use. Configuration information may further include an access port, an application start path, a user name, screen size and window settings for the user.

In step 1550, the client system configures the browser based on the configuration information. As a result of the configuration, the browser may automatically fetch, or fetch under the user's control, the page specified by a server address within the configuration information. At this point, the user may be presented with an application interface for the application that the user is intended to run. Alternatively, the user may be presented with the user's webtop from which the user may launch applications depending on the user's server side configuration.

In step 1560, if the user has opted to receive an executable file, the user may download the executable file and execute it to configure terminal emulation software to connect to an administrative or application server to begin application service provision.

Figure 16:
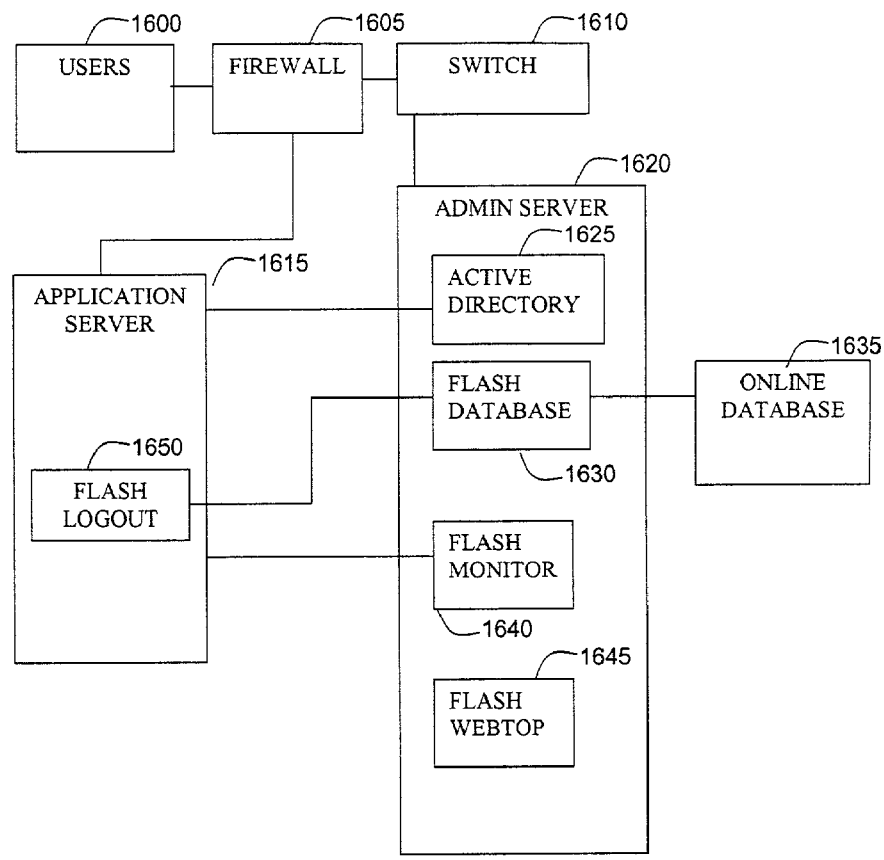
FIG. 16 depicts an infrastructure for providing flash load balancing according to an embodiment of the present invention.

FIG. 16 depicts an infrastructure for providing flash load balancing according to an embodiment of the present invention. Referring to FIG. 16, users 1600 are network connected via client systems including browser programs to a data center 100 through a firewall 1605. The firewall 1605 separates the user from the data center and may provide the functionality discussed above with respect to FIG. 1. The firewall 1605 may be connected to server iron 1610 for communicating with administrative and application servers within the data center. In addition, the firewall 1605 may be connected to application servers 1605 in the data center itself or in other disparate locations.

An administrative server 1620 is provided within the data center that includes an active directory 1625 for providing access control and other administrative functionality described with reference to FIGS. 9–11. The active directory may be coupled to the application server 1615 for propagating access control information to the application server.

The administrative server may also include a flash monitor process. The flash monitor process may run on multiple servers within the data center and not necessarily on an administrative server. However, the flash monitoring process may also run on the administrative server. Each flash monitoring process monitors the performance of one or more application servers based on arbitrary criteria. The criteria may include CPU usage, memory usage, whether or not the server is functioning, server MIPS, available server MIPS, available server memory and any other convenient criteria. The flash monitor processes store data on the application servers that they monitor into a flash database 1630.

The flash database includes a subset of the information in the on-line database 1635 and is updated from the online database in real time. It includes permission for each user that is on-line relating to which applications a user is authorized to use and which servers the user is authorized to run the applications from. The flash database also includes real time performance information for all accessible servers. The on-line database 1635 may include additional administrative information for users that is not necessary for the generation of a webtop for the user to launch applications from.

The flash database 1630 also may be coupled to logout processes resident on each application server. The logout processes may provide for storage in the flash database, of information for each user about the last server that the user logged out of for each application that the user is authorized to use. Abnormal terminations of application service may also be indicated and stored in the flash database. This logout and termination information for each application that the user has access to may be used to influence which application server the user connects to for each application the next time the user logs in and attempts to access the same application.

The flash webtop process 1645 is used to calculate the best performing servers and to make them available in a convenient and organized manner for users 1600 to access. When a user logs into the data center using the user's browser, the user is presented a web page from which the user may launch applications that the user is entitled to access. The web page includes a link for each application that the user may select. Each link includes address information for a server from which the user may boot the corresponding application.

According to an embodiment of the present invention, the flash web top process determines for each user which applications need to be included in the user's webtop. The flash webtop further calculates for each user, and each application that the user is entitled to access the server that has the best performance based on predetermined criteria. The address of the best server for each application is then embedded in a link for that user's application in that user's webtop. The user thus is given links to the best performing servers for each of his applications.

The calculation of which applications the user is entitled to have links to and which servers are included in the pool of servers for the performance calculation and the performance calculation itself are made based on the information in the flash webtop. The calculation includes determining a score based on one or more performance criteria including: CPU usage, memory usage, whether or not the server is functioning, server MIPS, available server MIPS, available server memory and any other convenient criteria. The performance calculation may also includes, in whole or in part, as a factor the last server that the user was connected to for each application and whether the termination of the user's session with that application was normal or abnormal. In the event of abnormal termination, the calculation of the link may automatically be set to the last server used by the user for the abnormally terminated application. In this manner, the user may be automatically re-routed to the last server used and may resume the abnormally terminated connection.

The web top for each user may be presented to the user based on a desired interface configuration selected by the user and stored in a database such as the flash database. The desired interface configuration may specify, for example, that the performance information (i.e. the score) for the best performing link selected for the user be displayed to the user in the webtop. The interface configuration for the webtop may further specify that links be provided to the user for each server authorized for each application. In this embodiment, the performance information for each available link may also be displayed effectively allowing the user to select the best performing link based on the flash load balance calculation. In still other embodiments, the user may specify that the available servers for each application be ranked by performance score or that only links for the top three scoring servers be provided.

In this manner, the user is provided with a convenient mechanism for accessing the best available servers for the user's application in a way that permits the applications to be stored anywhere in the data center or even remotely from the data center. The best servers authorized for the user for each application, regardless of the server location, are then collected and presented to the user for the user's use. This model allows a data center to organize itself to optimize deployment of individual applications within a data center or across multiple locations, rather than deploying applications on servers according to how the users and their organizations are assigned to servers.

Figure 17:
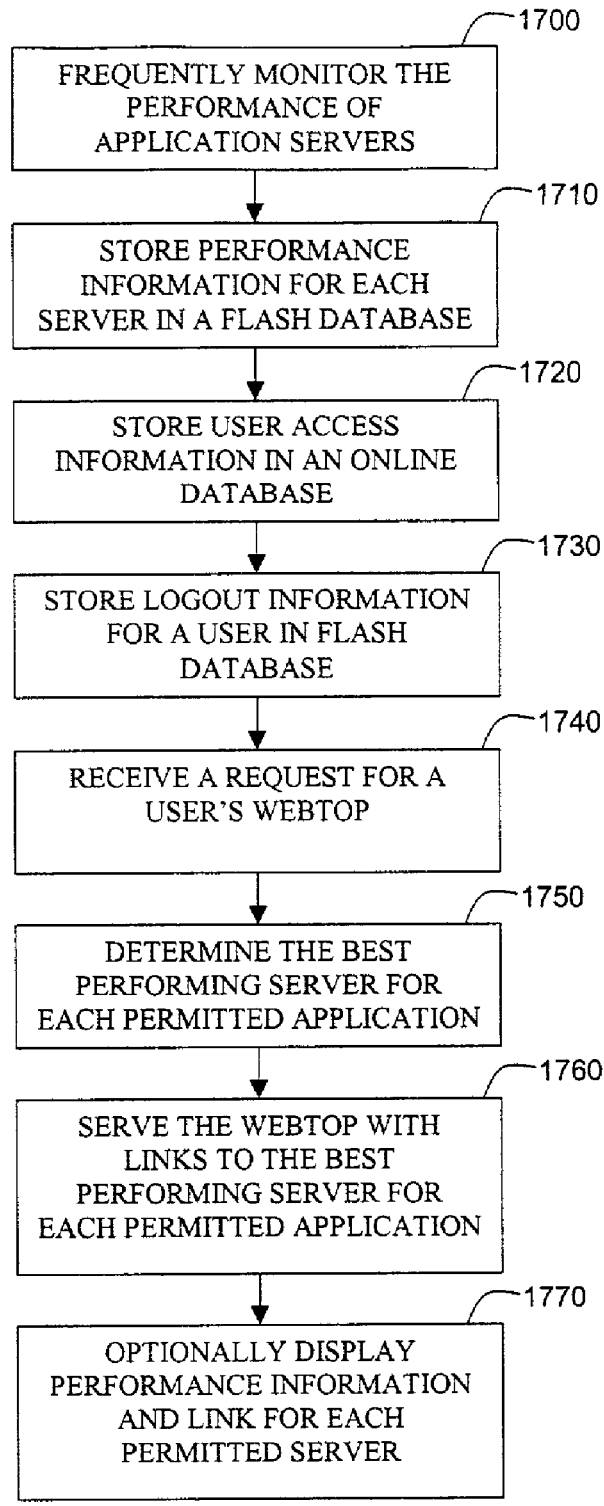
FIG. 17 depicts a method for providing flash load balancing according to an embodiment of the present invention.

FIG. 17 depicts a method for providing flash load balancing according to an embodiment of the present invention. Referring to FIG. 17, in step 1700 the monitoring processes frequently monitor performance criteria of application servers. The monitoring may be performed periodically, continuously in a rotating fashion or in any other convenient manner. In step 1710, performance criteria for each monitored server is stored in a flash database. In step 1720, user access information is stored in an online database for users that are presently online. In step 1730, when a user logs out or is otherwise terminated from an application session, logout information for the user and the last application(s) running for that user, including the identity of the server that the user logged out of or was terminated from, is stored in the flash database.

In step 1740, the administrative server receives a request from a user for the user's web top. In step 1750, the flash web top process determines the best performing server for each permitted application for the user based on the flash database. In step 1760, the flash web top process generates a web page including links to one or more of the best performing servers for each permitted application for the user. This web top is then transmitted as a web page to the user for the user's browser. The user may then select a link for the application which causes the user's browser to access the best performing server for that application. In step 1770, the web top process may arbitrarily display performance information for each link presented in the user's web top.

While particular embodiments have been disclosed, it will be understood by those having ordinary skill in the art that changes may be made to those embodiments without departing from the spirit and scope of the invention. For example, it will be understood that the various databases used in the flash load balancing operation may be a single database or multiple databases.

What is claimed is:

1. A method for determining a best performing server hosting permitted applications for a user at a data center, the method comprising:
    monitoring at least one performance characteristic of at least one application server;
    storing performance information for the at least one monitored application server in a performance information database;
    storing user access information in a user access information database;
    calculating, based on the performance information for the at least one monitored application server and the user access information, an address of the best performing server for each permitted application for the user;
    assembling a web page having at least one link, each link corresponding to an address of the best performing server for a permitted application for the user; and
    providing the at least one link to the best performing server prior to receiving a request from the user to access permitted applications.

2. The method according to claim 1, further comprising:
    monitoring a user logout; and
    storing in the performance information database the identity of a last server that the user was connected to.

3. The method according to claim 2, wherein the calculating of the address is based in part on the identity of a last sever that the user was connected to.

4. The method according to claim 1, wherein the calculating is performed by determining a score based on at least one of CPU usage and memory usage.

5. A system for determining a best performing server for permitted applications for a user, the system comprising:
    a server performance monitoring module implemented on a processor adapted to monitor at least one performance characteristic of at least one application server, to store performance information for the at least one monitored application server in a performance information database, to store user access information in a user access information database, and to calculate, based on the performance information and the user access information, an address of the best performing server for each permitted application for the user; and
    a user interface module implemented on a processor adapted to assemble a web page having at least one link, each link corresponding to an address of the best performing server for a permitted application for the user, and to provide the at least one link to the best performing server prior to receiving a request from the user to access permitted applications.

6. The system according to claim 5, wherein the server performance monitoring module is further adapted to monitor a user logout and to store in the performance information database the identity of a last server that the user was connected to.

7. The system according to claim 5, wherein the server performance monitoring module is further adapted to calculate an address based in part of the identity of the a last server that the user was connected to.

8. The method according to claim 5, the server is adapted to calculate an address of the best performing server by determining a score based on at least one of CPU usage and memory usage.

9. A computer program product comprising:
    a computer-readable medium having computer program code embodied therein which causes a processor to exute a process for determining a best performing server for permitted applications for a user, the computer program code adapted to:
    monitor at least one performance characteristic of at least one application server;
    store performance information for the at least one monitored application server in a performance information database;
    store user access information in a user access information database;
    calculate, based on the performance information for the at least one monitored application server and the user access information, an address of the best performing server for each permitted application for the user;
    assemble a web page having at least one link, the link corresponding to an address of the best performing server for a permitted application for the user; and
    provide the at least one link to the best performing server prior to receiving a request from the user to access permitted applications.

10. The computer in program product of claim 9, wherein the computer program code is further adapted to monitor a user logout and storing in the performance information database the identity of a last server that the user was connected to.

11. The computer program product of claim 9, wherein the calculating of an address is based in part of the identity of a last sever that the user was connected to.

12. The computer program product of claim 9, wherein the calculating is performed by determining a score based on at least one of CPU usage and memory usage.

* * * * *

UNITED STATES PATENT AND TRADEMARK OFFICE
CERTIFICATE OF CORRECTION

PATENT NO. : 7,050,963 B2  
APPLICATION NO. : 09/949657  
DATED : May 23, 2006  
INVENTOR(S) : James D. Flavin Page 1 of 1

It is certified that error appears in the above-identified patent and that said Letters Patent is hereby corrected as shown below:

Column 16, Line 20, after "of" delete "the".

Column 16, Line 29, delete "exute" and replace with --execute--.

Column 16, Line 50, after "computer" delete "in".

Column16, Line 57, delete "sever" and replace with --server--.

Signed and Sealed this

Third Day of October, 2006

JON W. DUDAS  
*Director of the United States Patent and Trademark Office*